(12) United States Patent
Azuma

(10) Patent No.: US 8,050,458 B2
(45) Date of Patent: Nov. 1, 2011

(54) FRONTAL VIEW IMAGING AND CONTROL DEVICE INSTALLED ON MOVABLE OBJECT

(75) Inventor: Takahiro Azuma, Yokohama (JP)

(73) Assignee: Honda elesys Co., Ltd., Yokohama-shi (JP)

( * ) Notice: Subject to any disclaimer, the term of this patent is extended or adjusted under 35 U.S.C. 154(b) by 807 days.

(21) Appl. No.: 12/139,952

(22) Filed: Jun. 16, 2008

(65) Prior Publication Data

US 2008/0310680 A1    Dec. 18, 2008

(30) Foreign Application Priority Data

Jun. 18, 2007  (JP) ................. 2007-160300

(51) Int. Cl.
*G06K 9/00* (2006.01)
*B60Q 1/48* (2006.01)

(52) U.S. Cl. ............... 382/104; 382/219; 340/932.2

(58) Field of Classification Search ............. 382/100, 382/103, 104, 105, 106, 107, 108, 154, 162, 382/168, 170, 173, 181, 193, 199, 209, 219, 382/232, 254, 255, 274, 275, 276, 286–291, 382/305, 312; 356/4.01; 340/438, 932.2
See application file for complete search history.

(56) References Cited

U.S. PATENT DOCUMENTS

| | | | |
|---|---|---|---|
| 7,266,220 B2 * | 9/2007 | Sato et al. | 382/104 |
| 7,375,651 B2 * | 5/2008 | Shimazaki et al. | 340/932.2 |
| 7,616,781 B2 * | 11/2009 | Schofield et al. | 382/104 |
| 7,728,721 B2 * | 6/2010 | Schofield et al. | 340/438 |
| 7,852,462 B2 * | 12/2010 | Breed et al. | 356/4.01 |
| 7,873,187 B2 * | 1/2011 | Schofield et al. | 382/104 |

* cited by examiner

*Primary Examiner* — Seyed Azarian
(74) *Attorney, Agent, or Firm* — Arent Fox LLP

(57) ABSTRACT

A frontal view imaging and control device installed on a movable object, includes: an image input unit receiving an image taken by an image device that captures a region of a road surface in a predetermined direction; a projection transformation unit linking each pixel of the image onto a virtual two-dimensional plane of a road surface through coordinate transformation so as to form a virtual projection image on the two-dimensional plane; a projection likelihood calculation unit dividing the virtual projection image into a distant view section and a close view section, and calculating similarity defined between a projection of the distant view section and a projection of the close view section; and an attitude angle calculation unit determining an angle of depression and a panning angle that maximize the similarity as a measured attitude angle that indicates an image capturing direction of the imaging device.

5 Claims, 11 Drawing Sheets

RELATIONSHIP BETWEEN (w,d) COORDINATE SYSTEM
AND ($\omega, \lambda$) COORDINATE SYSTEM RELATIONSHIP BETWEEN PROJECTION IMAGE COORDINATE SYSTEM (c, r)
AND ROAD SURFACE COORDINATE SYSTEM ($\omega$, $\lambda$)

RELATIONSHIP BETWEEN INPUT IMAGE COORDINATE SYSTEM (h, v)
AND IMAGING PLANE COORDINATE SYSTEM (x, y)

though the measured data are the same, errors may be included in corrected images. Moreover, in the technology disclosed in Patent Document 2, another problem is encountered in that, if a fine quantization is applied in order to minimize the errors, a great number of measured data are required to obtain the mode that is sufficient as an estimated value.

FRONTAL VIEW IMAGING AND CONTROL DEVICE INSTALLED ON MOVABLE OBJECT

CROSS-REFERENCE TO RELATED APPLICATION

The present application claims priority on the Japanese Patent Application No. 2007-160300 filed Jun. 18, 2007, the content of which is incorporated herein by reference.

BACKGROUND OF THE INVENTION

1. Field of the Invention

The present invention relates to an imaging sensor system which is to be installed on a movable object, such as a vehicle, that travels on a road, and which captures a road surface in its field of view, in particular, relates to a frontal view imaging and control device installed on a movable object which has function to automatically estimate the attitude of the imaging system with respect to the road surface on which the movable object travels.

2. Description of Related Art

An on-board frontal view imaging device is installed on the front portion of a vehicle in order to measure the position of a traveling subject vehicle so as to enable a stabilizing control or the like of the vehicle body.

Because such an on-board frontal view imaging device observes an exterior environment including a road surface while being installed on the vehicle, the attitude of a camera (an imaging unit) with respect to the vehicle and the road surface deviates from a standard attitude that has been determined during designing due to an installation error or load distribution.

Therefore, in order to compensate for shifting of the attitude of the imaging device from that at the installation thereof while using the images taken by such a camera, it is necessary to correct shifting of the attitude of the imaging device so that an apparatus, which caries out vehicle lane recognition and/or obstacle detection by using the images taken by the imaging device, exhibits designed performance by carrying out vehicle lane recognition (recognition of white lines or the like dram on the road surface) and/or vanishing point recognition thereby estimating the attitude of the imaging device.

In a conventional technology, when a vehicle travels straight at the center of a straight vehicle lane, the parameters representing the attitude of an imaging device are corrected based on the lane boundary lines drawn on the road surface and the vanishing point thereof and shifting of the attitude of the imaging device, i.e., shifting of the optical axis, is adjusted by image processing (see, for example, Japanese Unexamined Patent Application, First Publication No. 2002-259995, hereinafter referred to as Patent Document 1).

Moreover, in another conventional technology, the most frequent value (i.e., the mode) is selected from a histogram representing the measured parameter distribution, the mode is treated as an estimated value, and the optical axis is corrected by image processing (see, for example, Japanese Unexamined Patent Application, First Publication No. H11-337310, hereinafter referred to as Patent Document 2).

In another conventional technology, a vehicle lane and a vanishing point are determined by detecting peaks originating from a white line representing the boundary between vehicle lanes that is obtained from projection of a brightness image obtained by polar coordinate conversion with a vanishing point candidate as the origin (see, for example, Japanese Unexamined Patent Application, First Publication No. 2002-150302, hereinafter referred to as Patent Document 3).

SUMMARY OF THE INVENTION

However, in the technology disclosed in Patent Document 1, a problem is encountered in that, in a region where white lines are not used on the road surface for boundary marking of vehicle lanes, it is not possible to correct the attitude angle of an imaging device because the parameters representing the attitude of the imaging device cannot be obtained.

In the technology disclosed in Patent Document 2, a problem is encountered in that because the mode may vary due to difference in quantization for producing histograms even though the measured data are the same, errors may be included in corrected images. Moreover, in the technology disclosed in Patent Document 2, another problem is encountered in that, if a fine quantization is applied in order to minimize the errors, a great number of measured data are required to obtain the mode that is sufficient as an estimated value.

In the technology disclosed in Patent Document 3, a problem is encountered in that, because the vanishing point or the like is recognized with reference to white lines drawn on the road surface as in Patent Document 1, it is not possible to correct the attitude angle of an imaging device in a region where white lines are not used on the road surface for boundary marking of vehicle lanes.

The present invention was made in view of the above circumstances, and an object of the present invention is to provide a frontal view imaging and control device installed on a movable object which can measure, without referencing to white lines drawn on the road surface, the attitude of an imaging device at a stable frequency even on the road surface having no significant features, and which has function to correct the parameters defog the attitude of the imaging device that enables accurate estimation of deviation in the attitude angle based on a limited number of measured data.

The present invention provides a frontal view imaging and control device installed on a movable object, including: an image input unit receiving an image taken by an imaging device that captures a region of a road surface in a predetermined direction; a projection transformation unit linking each pixel of the image onto a virtual two-dimensional plane of the road surface through coordinate transformation in accordance with an optical model of the imaging device so as to form a virtual projection image on the two-dimensional plane; a projection similarity calculation unit dividing the virtual projection image into a distant view section and a close view section along a longitudinal axis extending in a straight forward direction, projecting the distant view section and the close view section onto a lateral axis, and calculating similarity defined between a projection of the distant view section and a projection of the close view section; and an attitude angle calculation unit determining an angle of depression and a panning angle that maximize the similarity between the projection of the distant view section and the projection of the close view section as a measured attitude angle that indicates an image capturing direction of the imaging device.

The above frontal view imaging and control device may further include a pixel value smoothing unit smoothing, in a time sequence manner, each pixel included in the image taken by the imaging device.

The above frontal view imaging and control device may further include a travel state detection unit calculating a turning radius based on a translation velocity and a yaw rate of the movable object respectively measured by a speed sensor and an inertia sensor that are installed on the movable object; and a turning effect correction unit correcting the panning angle based on the turning radius.

The above frontal view imaging and control device may further include an attitude angle estimation unit calculating an estimation value of a true attitude angle based on an estimated mixture distribution profile that is obtained, based on a set of the measured attitude angles, that form a mixture of a normal distribution of measured values containing errors and a uniform distribution of false measurements that are obtained when input images contain disturbances.

The present invention also provides a frontal view imaging and control program that allows a computer to function as the above frontal view imaging and control device installed on a movable object.

According to the frontal view imaging and control device installed on a movable object of the present invention, when the traveling direction of the movable object nearly coincides with the direction of the vehicle lane, the attitude angle calculation unit repeatedly selects attitude angle candidates, the projection transformation unit projects the input image onto a virtual road plane coordinate system based on the attitude angle candidates so as to form a projection image, the projection similarity calculation unit equally divides the projection image into at least two rectangular sections, the projection similarity calculation unit calculates feature values for every longitudinal pixel column included in the projection, the projection similarity calculation unit generates an array consisting of feature values for every rectangular section as the projection of the rectangular section, the projection similarity calculation unit calculates similarity among at least two rectangular sections longitudinally arranged along the vehicle lane direction, and the attitude angle calculation unit selects one of the attitude angle candidates that maximizes the similarity as a measured attitude angle by using the tendency that the similarity becomes greater when the movable object travels along the vehicle lane direction, thereby it is possible to determine the attitude angle of the imaging device even when there are no significant lane markers.

Moreover, according to the frontal view imaging and control device installed on a movable object of the present invention, it is possible to estimate the attitude angle of the imaging device even when each of the sections of the road surface in the image does not include features of remarkable pattern that allow measurement of its motion.

Moreover, according to the frontal view imaging and control device installed on a movable object of the present invention, because the attitude angle estimation unit calculates the maximum similarity estimation value of a true attitude angle based on an estimated mixture distribution profile that is obtained, based on a set of the measured attitude angles, that forms a mixture of a normal distribution of measured values containing errors and a uniform distribution of false measurements, the estimation value of the attitude angle can be obtained without being influenced by the false measurements. In addition, even when the number of measurements of the attitude angle is comparatively small, it is possible to stably obtain the estimation values of the attitude angle, and to correct the offset from the reference attitude angle of the imaging device.

DETAILED DESCRIPTION OF THE INVENTION

Figure 1:
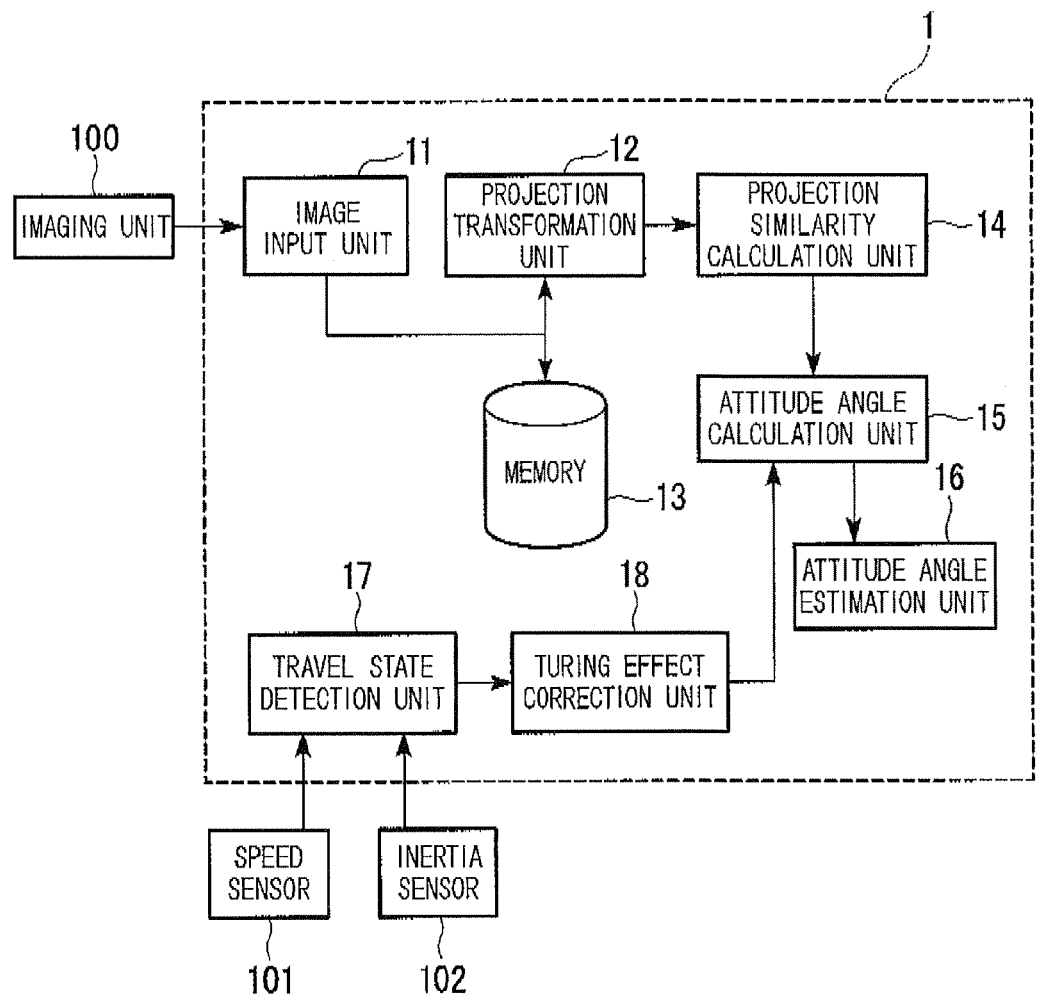
FIG. 1 is a block diagram showing a constitution example of a frontal view imaging and control device installed on a movable object according to a first embodiment of the present invention.

A frontal view imaging and control device installed on a movable object according to an embodiment of the present invention will be explained below with reference to appended drawings. FIG. 1 is a constitution example of the frontal view imaging and control device installed on a movable object according to the embodiment.

In FIG. 1, a frontal view imaging and control device installed on a movable object 1 includes an image input unit 11, a projection transformation unit 12, a memory 13, a projection likelihood calculation unit 14, an attitude angle calculation unit 15, an attitude angle estimation unit 16, a travel state detection unit 17, and a turning effect correction unit 18.

The image input unit 11 receives, in a time sequence manner, captured images taken by an imaging unit 100, such as a CCD (Charge Coupled Device) camera, at a predetermined interval, and stores the latest one frame of the sequential images in the image storage area of the memory 13 while linking to time stamp. If a time sequence filter, which will be explained separately, is used, the latest filter output is stored, and the latest filter output is updated as the captured images are input.

The projection transformation unit 12 projects the pixels, one after another, included in the captured image stored in the image storage area of the memory 13 onto a two-dimensional plane, which is a virtual road surface simulating a road surface, at the corresponding coordinates in accordance with the optical model (which includes an attitude angle, a focal length, or the like) of the imaging unit 100 so that a projection image is generated on the two-dimensional plane.

The projection likelihood calculation unit 14 calculates the similarity between a distant view section and a close view section by: dividing the projection image into sections, e.g., into two sections consisting of the distant view section and the close view section, over a longitudinal axis that is defined in the two-dimensional plane so as to correspond to the translation direction; projecting feature quantities respectively distributed in the distant view section and the close view section onto separate lateral axes; and comparing histograms of the distant view section and the close view section obtained by the projection onto the lateral axes.

The attitude angle calculation unit 15 reads out the captured image liked with the time stamp from the image storage area of the memory 13, and determines the angle of depression and the panning angle that maximize the similarity between the projection of the distant view and the projection of the close view as a measured attitude angle that indicates the direction of image capturing by the imaging unit 100.

The attitude angle estimation unit 16 calculates estimation values of the true attitude angles based on an estimated mixture distribution profile that is obtained, based on a set of measured attitude angle values obtained by the attitude angle calculation unit 15, that forms a mixture of a normal distribution of the measured values containing errors and a uniform distribution of false measurements.

The travel state detection unit 17 measures the travel speed and yaw rate of the movable object during the travel hereof using a speed sensor 101 and an inertia sensor (yaw rate sensor) 102, and detects a stable translation state or a stable turning state of the movable object.

The turning effect correction unit 18 outputs an amount of correction for the calculated panning angle in response to the turning angular velocity that is input thereto.

Next, the operation of each of the units will be explained.
(Projection Transformation)

The operation of projection transformation that is carried out by the projection transformation unit 12 will be explained below. In the following description for the operation of projection transformation, the road surface near the movable object is assumed to be flat, and, hereinafter, his is defined as a road plane (aforementioned two-dimensional plane).

As the imaging plane coordinate system of the imaging unit 100, the (x, y) coordinate system shown in FIG. 1 is defined such that the center of the optical axis is the origin.

On the other hand, the y axis is defined to be perpendicular to the optical axis L and the x axis, and positive direction thereof is defined to be away from the road plane.

The imaging device 100 sends images formed on the imaging plane G in the (x, y) coordinate system to the image input unit 11 as captured images.

The image input unit 11 stores the captured image in the image storage area of the memory 13 every time the captured image is input.

Then, the projection transformation unit 12 sequentially receives the captured images from the image storage area, and projects the pixels of each of the captured images onto the virtual two-dimensional plane of the road surface so as to form projection images.

Figure 2:
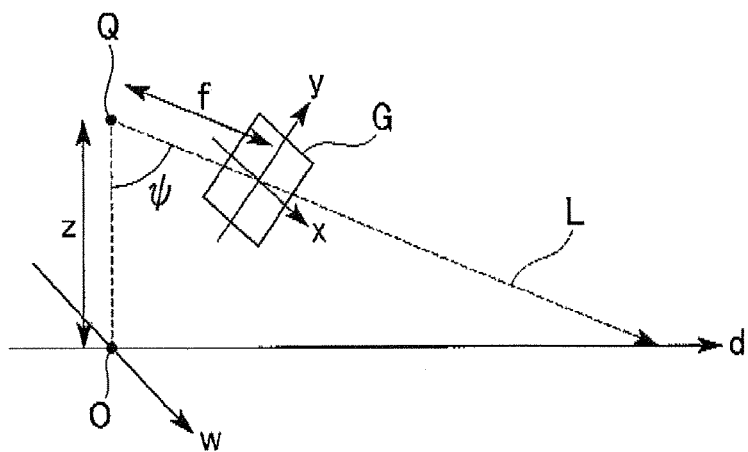
FIG. 2 is a schematic diagram illustrating coordinate transformation between a captured image and a projection images.

As shown in FIG. 2, for the coordinate system of the two-dimensional plane, a two-dimensional coordinate system (w, d) is defined by setting the point directly down from the focal point Q of the imaging unit 100 to be the origin O, the straight line obtained by projecting the optical axis line of the imaging unit 100 onto the road plane to be the d axis (longitudinal axis), the straight line on the road plane and perpendicular to the d axis to be the w axis (lateral axis), and the right hand to be the positive direction and the left had to be the negative direction at facing the optical axis.

According to this arrangement, the projection image projected on the virtual two-dimensional plane of the road surface can be conceived of by reversely tracing along the optical path of the imaging device 100 from the captured image that is input.

It is defined that the size of one pixel of the image to be transformed corresponds to $\Delta y$ meters in height and $\Delta x$ meters in width in the captured image on the imaging plane.

On the other hand, it is defined that the size of one pixel of the projection image corresponds to $\Delta d$ meters in height and $\Delta w$ meters in width on the two-dimensional plane of the road surface.

The aforementioned projection transformation indicates a transformation process of a coordinate point in the captured image taken by the imaging unit 100 to a coordinate point in the projection image on the two-dimensional plane of the road surface. The transformation process carried out by the projection transformation unit 12, in practice, is a calculation process in which the pixel value of each of the pixels included in the projection image on the two-dimensional plane of the road surface is calculated from the pixel value of the pixels included in the captured image taken by the imaging unit 100.

Figure 3:
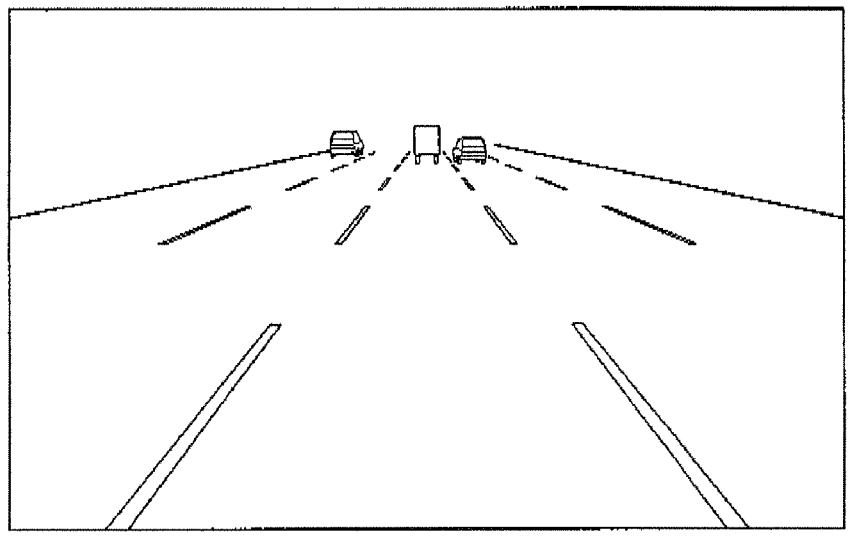
FIG. 3 is a schematic diagram showing an example of captured image taken by the frontal view imaging and control device installed on a movable object.
Figure 4:
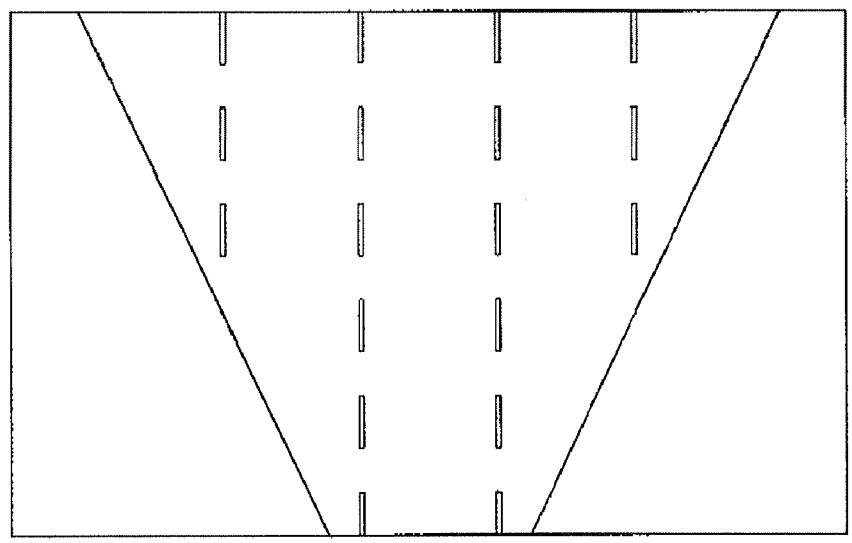
FIG. 4 is a schematic diagram showing an example of projection image obtained by applying projection transformation to the captured image shown in FIG. 3.

An example of the captured image taken by the imaging unit 100 is shown in FIG. 3, and an example of the projection image obtained by the projection transformation of the entire captured image is shown in FIG. 4.

In this projection transformation, the relationship between the (x, y) coordinate system of the imaging plane and the (w, d) planner coordinate system of the road surface, i.e., the relationship between a coordinate point (x, y) on the imaging plane and a coordinate point (w, d) on the road plane is expressed by following Equations (1) and (2), where the focal length of the imaging unit 100 is denoted by "f", the level of the focus Q measured from the road plane is denoted by "z", and the angle of depression of the optical axis L of the imaging unit 100 is denoted by $\phi$ (rad). The value of the angle of depression $\phi$ is zero when the optical axis L of the imaging unit 100 perpendicularly orients the road plane, and is $\pi/2$ when the optical axis L of the imaging unit 100 is in parallel with the road plane.

$$\begin{pmatrix} w \\ d \end{pmatrix} = \frac{z}{f\cos\varphi - y\sin\varphi} \begin{pmatrix} x \\ f\sin\varphi + y\cos\varphi \end{pmatrix} \quad (1)$$

$$\begin{pmatrix} x \\ y \end{pmatrix} = \frac{f}{z\cos\varphi + d\sin\varphi} \begin{pmatrix} w \\ d\cos\varphi - z\sin\varphi \end{pmatrix} \quad (2)$$

Hereinafter, the transformation from the (x, y) coordinate system to the (w, d) coordinate system expressed by Equation (1) is referred to as the forward transformation, and the transformation from the (w, d) coordinate system to the (x, y) coordinate system expressed by Equation (2) is referred to as the inverse transformation.

The distance z of the focus Q from the origin O in the (w, d) coordinate system, the focal length f of the imaging unit 100, and the angle φ of depression of the optical axis L in Equation (1) can be deemed as constants because these are not change depending on the position (x, y) in the imaging plane.

Hereinafter, a straight line defined by a constant y coordinate on the imaging plane in the (x, y) coordinate system is referred to as a scanning line.

Consequently, because the calculation for "d" for any coordinate points (x, y) on the arbitrary scanning line does not depend on "x", "d" can be deemed as a constant.

Figure 5:
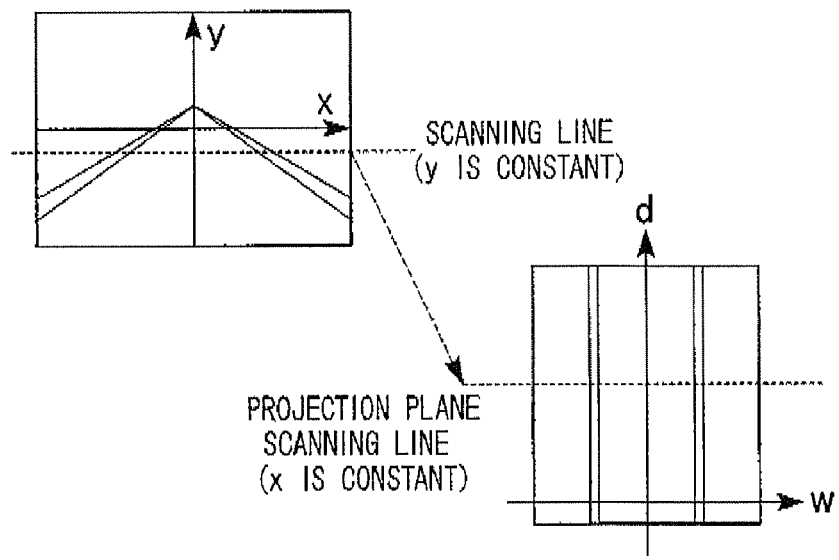
FIG. 5 is a schematic diagram illustrating a projection processing (i.e., a copy processing of a pixel value between corresponding pixels) from a captured image to a projection image.

In other words, as shown in FIG. 5, the scanning line, whose "y" coordinate on the imaging plane of the imaging unit 100 is constant, is mapped onto the (w, d) coordinate system of the road plane as a straight line whose "d" coordinate is constant.

Hereinafter, the scanning line mapped on the road plane is referred to as a projection plane scanning line.

As described above, because "y" coordinate on the projection plane scanning line is constant, the calculation for "w" can be simplified as follows according to Equation (1), with C being a constant.

$$w = C \times x$$

In other words, in the coordinate transformation from the (x, y) coordinate system to the (w, d) coordinate system, the amount of calculation per one coordinate point can be approximately as little as one time of multiplication.

When "w" is sequentially calculated while the position "x" on the scanning line is incremented by a constant of Δx, the recurrence formula is defined as follows, where constant $C_w = C \times \Delta_x$, and "w" corresponding to "x" is expressed by w(x).

$$w(x+1) = w(x) + C_w$$

In other words, in the forward transformation according to Equation (1), the amount of calculation per one coordinate point can be approximately as little as one time of addition.

It is understood from the constitution of Equations (1) and (2) that "d" must be constant, i.e., "y" must be constant in order to have a linear relationship between the (w, d) coordinate system and the (x, y) coordinate system.

In such a linear coordinate transformation, the distance between two points in the original coordinate system changes to a value obtained by multiplying the original distance by a constant in the coordinate system.

In addition, the recurrence formula with regard to the pre-transformation coordinate system which is expressed by addition of constants becomes another recurrence formula in the post-transformation coordinate system which is also expressed by addition of constants.

As described above, when the projection image is generated by using the mapping from the (x, y) coordinate system to the (w, d) coordinate system through the forward transformation according to Equation (1), the pixels of the captured image are selected one after another, the coordinate point (w, d) in the road plane corresponding to the coordinate point (x, y) of the center of the selected pixel in the imaging plane is calculated, and the pixel values of the coordinate points (x, y) in the imaging plane are copied and given to the pixels of the road surface projection image located at the coordinate points (w, d), respectively.

During the generation of the projection image, the projection image projected onto the road surface coordinate system can include, other than the pixels having normally copied pixel values, pixels having no pixel value, or pixels each of which has been given pixel values twice or more times due to duplicated mappings.

Because the simplification is applied that each of the pixel values of the imaging system corresponds to an observed point of the road surface, the observation points corresponding to the pixels of the imaging plane through the projection transformation are, on the road plane, sparse in the distant view section, and densely distributed in the close view section.

When there are pixels having no pixel value as mentioned above, the pixel value of the pixel next to the pixel having no pixel value may be given to the pixel having no pixel value, or alternatively, an average pixel value, which is obtained from the pixel values of the pixels adjacent to or neighboring to the pixel having no pixel value, may be used as a correction value for interpolation. By using such methods, existence of pixels having no pixel value due to failed copy of the pixel values can be avoided.

On the other hand, when there are pixels each of which has been given pixel values twice or more times due to duplicated mappings, the simplest solution is to sequentially overwrite the pixel values, and to simply use the finally given pixel value. Alternatively, if the computational resources are abundant, the copied and given pixel values may be summed up whenever duplicated copy is made, the number of copies for the same pixel may be counted, then an average pixel value may be calculated when all of the copy processes are completed, and the average pixel value may be used as the pixel value of the particular pixel.

When generating the projection image using the inverse transformation from the road plane coordinate system (w, d) to the input image (imaging plane) coordinate system (x, y), "x" can be obtained by a simple equation of $x = C_2 \times w$, where $C_2$ is a constant for a fixed "d", when z, f, and φ are assumed to be constants in Equation (2), since 'y' only depends on "d", and "d" is fixed.

Accordingly, when generating the projection image by selecting the pixel coordinates one after another in the post-transformation projection image, and identifying the corresponding pixel coordinates in the pre-transformation input image through the inverse transformation, there is an advantage that the pixel value is copied and given to each of the pixels in the projection image just one time. However, it is necessary that the input image as an entirety be stored in the memory, and it is not possible to start the generation of the projection image until the entire input image is obtained. In addition, fine patterns in the input image may not be reflected on the projection image if only a method is used in which one pixel value is copied to one of the pixels, which may lead to undesirable results.

Here, a case in which the panning angle (relative directions) of the optical axis L of the imaging unit 100 is not zero is discussed. The panning angle θ represents the relative direction angle with respect to the straight forward direction of the vehicle. The panning angle θ is defined to be zero at the straight forward direction of the vehicle, left-turn direction (counterclockwise direction) gives positive value, and right-turn direction (clockwise direction) gives negative value expressed in a unit of radian (rad).

When the straight forward direction of the vehicle is placed on the λ axis, the d axis is obtained by rotating the λ axis by an angle of θ to the left on the two-dimension road plane.

Figure 6:
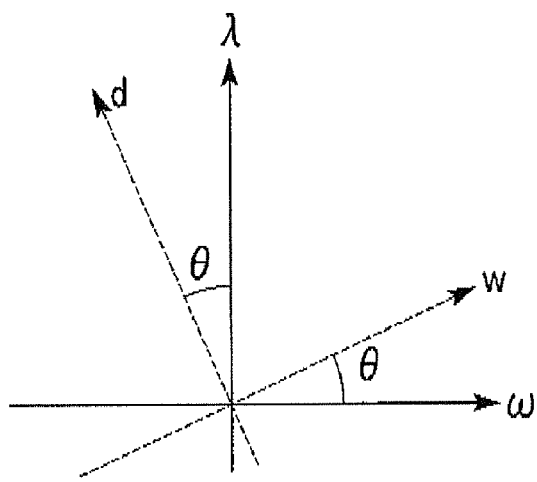
FIG. 6 is a schematic diagram showing the relationship between a projection image coordinate system and a coordinate system of projection image with pant angle.

As shown in FIG. 6, a (ω, λ) coordinate system is conceived of by placing the λ axis on the vertical axis, and by placing the ω axis, which is obtained by rotating the w axis by an angle of θ to the left, on the horizontal axis. In FIG. 6, if the panning angle is denoted by θ, the coordinate point (ω, λ) in the road plane after the projection transformation, which corresponds to the coordinate point (x, y) in the imaging plane, can be calculated by rotating the coordinate point (w, d), which is obtained by assuming the panning angle to be zero in Equation (1), by an angle of θ to be counterclockwise around the origin (0, 0).

Accordingly, Equation (3) expressing a forward transformation is obtained by applying a two-dimensional rotation matrix to Equation (1).

$$\begin{pmatrix} \omega \\ \lambda \end{pmatrix} = \begin{pmatrix} \cos\theta & -\sin\theta \\ \sin\theta & \cos\theta \end{pmatrix} \begin{pmatrix} w \\ d \end{pmatrix} = \quad (3)$$

$$\therefore \frac{z}{f\cos\varphi - y\sin\varphi} \begin{pmatrix} \cos\theta & -\sin\theta \\ \sin\theta & \cos\theta \end{pmatrix} \begin{pmatrix} x \\ f\sin\varphi + y\cos\varphi \end{pmatrix} \begin{pmatrix} \omega \\ \lambda \end{pmatrix} =$$

$$\frac{z}{f\cos\varphi - y\sin\varphi} \begin{pmatrix} x\cos\theta - y\sin\theta\cos\varphi - f\sin\theta\sin\varphi \\ x\sin\theta + y\cos\theta\sin\varphi + f\cos\theta\sin\varphi \end{pmatrix}$$

A linear equation representing the scanning line on the road plane in the (ω, λ) coordinate system can be obtained by assuming z, f, and φ to be constants, fixing "y", and unifying constant terms. In this case, the amount of calculation per one coordinate point is as few as two times of multiplication and two times of addition.

Under the above assumption, even when a panning angle of θ is considered, the projection transformation can be carried out, while the amount of calculation per one coordinate point is as few as two times of addition, by using following Equation (4) representing a recurrence formula for "x" for every scanning line in the input image.

$$\omega(x+1) = \omega(x) + C_\omega$$

$$\lambda(x+1) = \lambda(x) + C_\lambda$$

where $C_\omega$ add $C_\lambda$ are constant with respect to "y"

$$C_\omega = zx \cos\theta/(f\cos\varphi - y\sin\varphi)$$

$$C_\lambda = zx \sin\theta/(f\cos\varphi - y\sin\varphi) \quad (4)$$

On the other hand, the coordinate transformation formula representing the inverse transformation from the (ω, λ) coordinate system to the (x, y) coordinate system with the panning angle θ not being zero is expressed by following Equation (5); therefore, division must be carried out for every coordinate point even if λ or ω is fixed.

$$\begin{pmatrix} w \\ d \end{pmatrix} = \begin{pmatrix} \cos\theta & \sin\theta \\ -\sin\theta & \cos\theta \end{pmatrix} \begin{pmatrix} \omega \\ \lambda \end{pmatrix} \begin{pmatrix} x \\ y \end{pmatrix} = \quad (5)$$

$$\therefore \frac{f}{z\cos\varphi + (\lambda\cos\theta - \omega\sin\theta)\sin\varphi} \begin{pmatrix} (\omega\cos\theta + \lambda\sin\theta) \\ (\lambda\cos\theta - \omega\sin\theta)\cos\varphi - z\sin\varphi \end{pmatrix}$$

Accordingly, when $d_t$ is defined as $d_t = (\lambda \cos\theta - \omega \sin\theta)$ in above Equation (5), and a set of points (ω, λ) is considered so that $d_t$ is constant, the set of points (ω, λ) forms a straight line.

Because, at the coordinate points (ω, λ) on this straight line, "y" coordinate corresponding to $d_t$ is constant according to Equation (5), the group of corresponds coordinate points (w, d) forms a projection plane scanning line in parallel with the "w" axis. If $d_t$ is calculated beforehand, and $d_t$ is deemed as a constant in Equation (4), the calculation of Equation (4) can be carried out with the amount of calculation to be as much as in the case of the forward transformation while avoiding division calculation for every coordinate point.

Figure 7:
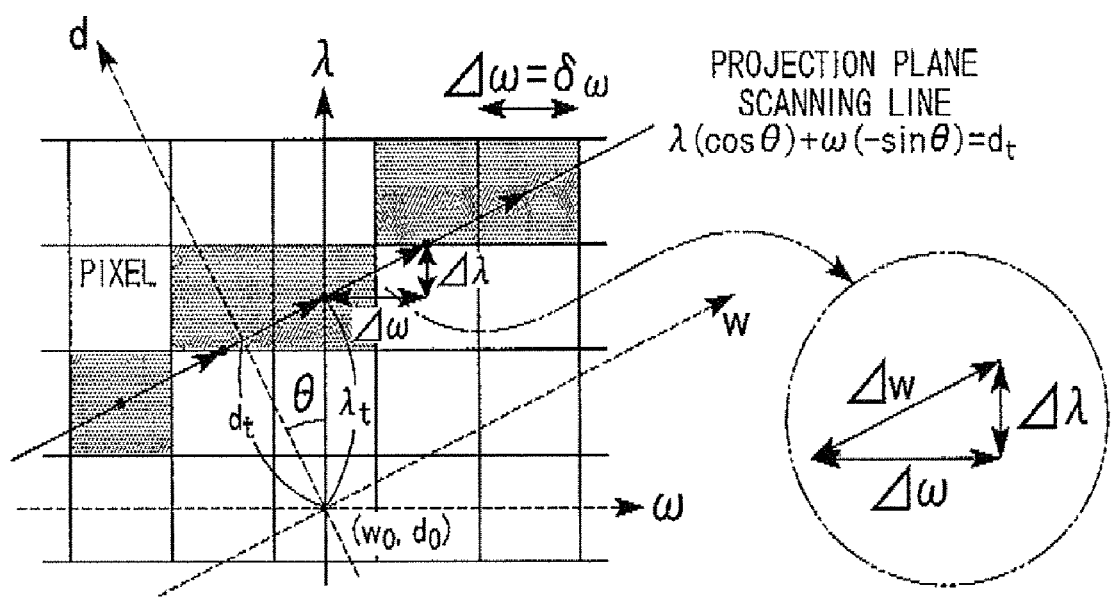
FIG. 7 is also a schematic diagram showing the relationship between the projection image coordinate system and the coordinate system of projection image with panning angle.

As shown in FIG. 7, when generating the projection image, the coordinate points (w, d) in the road plane are selected in a continuous manner so that there is no gap between the selected coordinate points. More specifically, $d_t$ is sequentially selected based on a linear equation $d_t = (\lambda \cos\theta - \omega \sin\theta)$.

In the following description, it is assumed that the projection images are stored in the image storage area of the memory 13 as a pixel array in the form of two dimensional array with name G. Hereinafter, the array component located at "r" row and "c" column is expressed as G[r][c] according to the pseudo C language. According to the normal practice in matrix calculation, the lateral column in the two-dimensional array is referred to as "row", and the longitudinal column is simply referred to as "column"; however, when possible confusion occurs, "row" may be referred to as "lateral column", and "column" may be referred to as "longitudinal column". Here, "r" denotes the pixel position on the longitudinal axis, and "c" denotes the pixel position on the lateral axis.

On the other hand, in a manner similar to the case of the array G, the captured image is stored in the image storage area of the memory 13 in the form of an array M in which each array component M[h] [v] represents one pixel. Here, "v" denotes the pixel position on the longitudinal axis, and "h" denotes the pixel position on the lateral axis.

The pixel arrays such as the array G and array M do not have to be stored in the memory as an entirety thereof; however, hereinafter, it is assumed that both of the arrays are stored in the image storage area of the memory 13 as an entirety thereof in order to simplify the explanation for the calculation method.

When the array G is deemed to be a mapping function mapping a position (r, c) to a pixel value, an expression G(r, c) is used. In this case, whether each of the pixel values of the projection image is stored in the image storage area (hereinafter referred to as a memory) of the memory 13 is not discussed.

It is assumed that the aforementioned pixel value is to be a three-dimensional real number vector when the image to be processed is a color image, and the pixel value is a one-dimensional real number when the image to be processed is a monochrome image.

In the following description, pixel values expressing brightness by one-dimensional real numbers are to be discussed for the sake of simplification; however, the similar process can be applied to the case of color images. A calculation process similar to the process explained below can be applied as long as the pixel values are quantities of which scalar product can be defined.

Because the resolution for the input image is set so as to be sufficient for monitoring the road in a distant view, this resolution is excessive for the requirement for a close view.

For example, a pixel resolution of approximately 5 cm in the road surface is suitable for detecting lane boundaries; however, when one pixel width corresponds to 5 cm on the road surface in the distant view, the image in the close view is observed with a resolution of ten or more pixel widths per 5 cm on the road surface.

Because, in the case of the projection image, the image resolution (cm/pixel) on the road surface in a distant view section is equivalent to that in a close view section, excessiveness in the image resolution in the close view section can be avoided, which is advantageous because the amount of memory and computational cost that are required for the processes after the projection transformation can be reduced.

As already described above, because the resolution, i.e., the density of observation points, on the road surface in the close view section is different from that in the distant view section in the input image, the pixels in the captured image and the pixels in the projection image do not correspond one to one.

Due to this, when the process is carried out in which the pixels M[r][c] in the input image are sequentially selected one after another, and the pixel values of the selected pixels are respectively copied and given to the pixels G[r][C] one after another which correspond to the pixel positions (h, v), there may be some pixels in the projection image which do not have the pixel value.

One of the methods that prevent leaving any pixels with no pixel value is a method using an inverse coordinate transformation. This method includes the steps of selecting, first, the pixels G[r][c] in the projection image one after another, in reverse operation to the above method, obtaining the pixels M(h, v) in the input image which correspond to the selected pixels in the projection image through the inverse coordinate transformation, and copying and giving the pixel values of the pixel M(h, v) to the pixels G[r][c]. Here, "h" and "v" respectively represent column number and row number in the pixel array. In the following description, it is assumed that the pixel values of the pixels in the captured image are copied and given to the pixels in the projection image using the aforementioned inverse coordinate transformation.

It should be noted that if the position of the pixel in the captured image, which corresponds to the pixel in the projection image, is out of the area that can be captured by the imaging unit 100 (i.e., out of the imaging field of the imaging unit 100), the pixel value of such a pixel in the projection image cannot be calculated. Hereinafter, such a pixel whose pixel value cannot be calculated is referred to as an invalid pixel.

Figure 8:
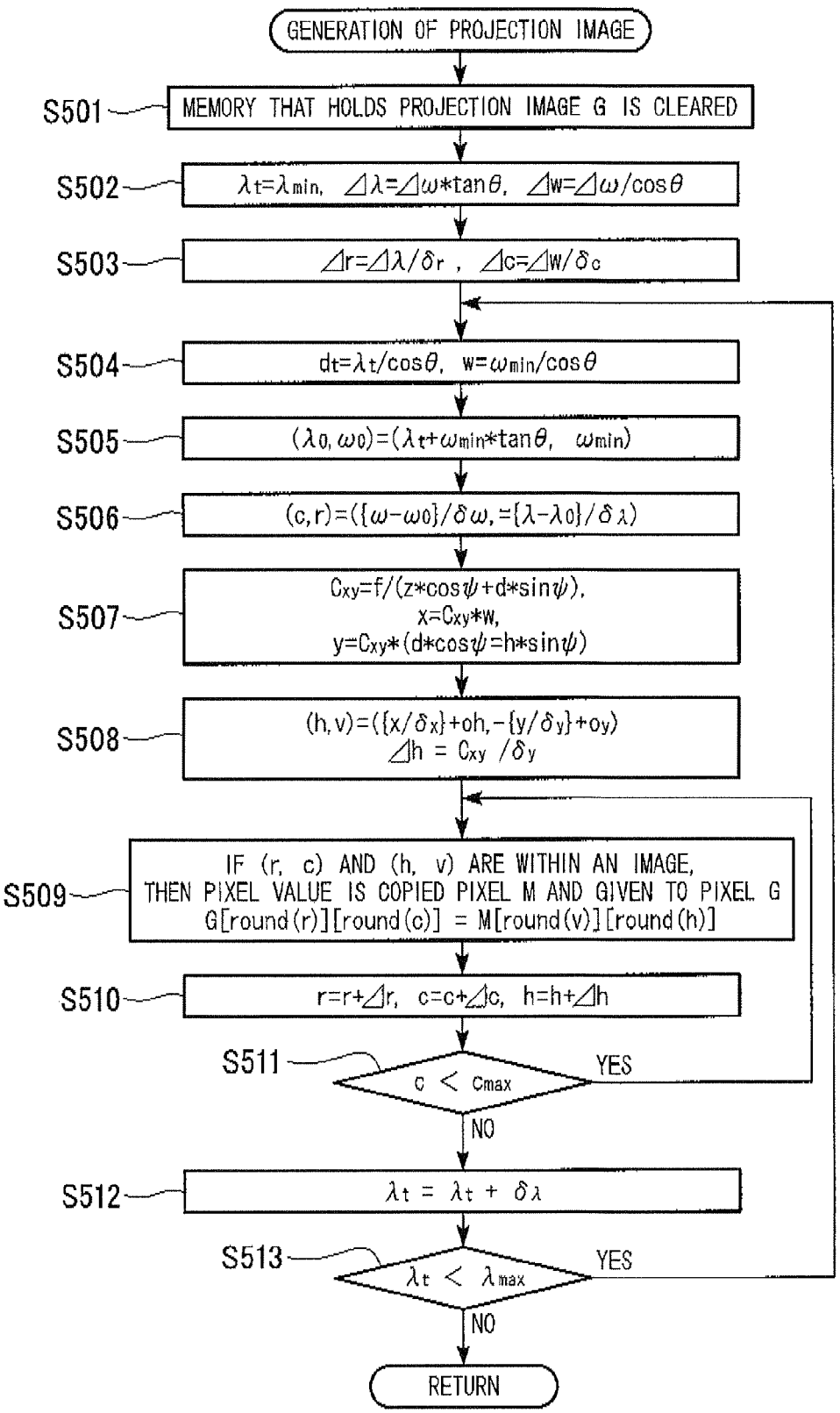
FIG. 8 is a flowchart shot an operation example of the process of generating a projection image carried out by a projection transformation unit 12.

Next, the projection transformation process carried out by the projection transformation unit 12 in the present embodiment will be explained with reference to FIG. 8. FIG. 8 is a flowchart illustrating an operation example of the projection transformation carried out by the projection transformation unit 12.

In step S501, the projection transformation unit 12 initializes the pixel value of all of the pixels belonging to G in the memory to be "−1". The pixel value of "−1" indicates an invalid pixel.

Figure 9:
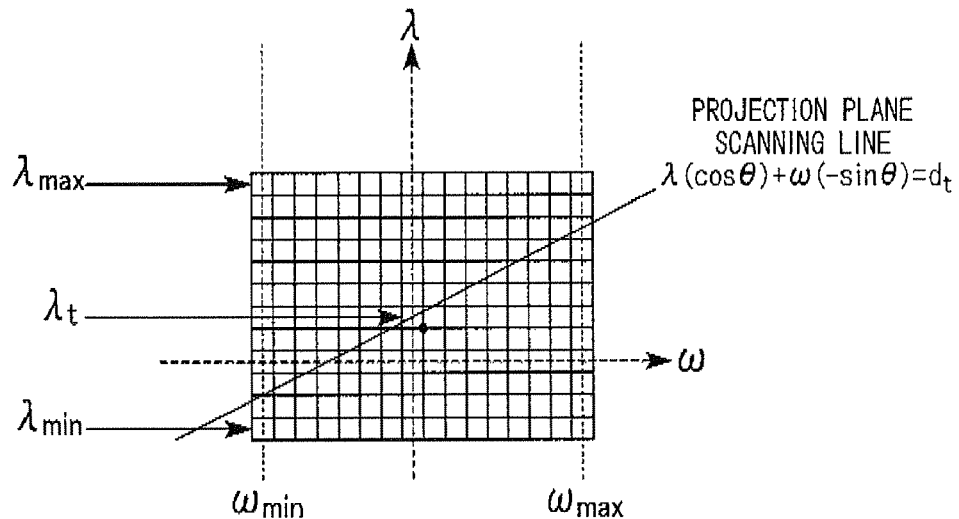
FIG. 9 is a schematic diagram illustrating calculation of beginning point of a projection plane scanning line in a road surface coordinate system.

Then, in step S502, as in the coordinate system of the road surface shown in FIG. 9, the variable $\lambda_t$ is initialized by the minimum value $\lambda_{min}$.

Also, depending on the panning angle θ, the increment $\Delta\lambda$ of the λ coordinate and the increment $\Delta\omega$ of the ω coordinate are defined as follows, as shown in FIG. 7: $\Delta\lambda = \Delta\omega \times \tan\theta$ and $\Delta w = \Delta\omega/\cos\theta$. It should be noted that the increment $\Delta\omega$ of the ω coordinate is equal to the pixel width $\delta_\omega$. As shown in FIG. 7, $\Delta\omega$, $\Delta\lambda$, and $\Delta w$ respectively indicate the ω, λ, and w components of the vector representing the incremental distance and direction of a point moving along the projection plane scanning line.

If $\theta < \pi/2$, by sequentially selecting pixels in accordance with the movement of the point moving along the projection plane scanning line, it is possible to select the pixels on the projection plane scanning line for every longitudinal pixel array without shortage or overlap.

In other words, as shown in FIG. 7, it is possible to handle the pixels in the projection image without having a space by using a recurrence formula of $\lambda_{t+1} = \lambda_t + \delta\lambda$ (step S512), moving the projection plane scanning line one pixel by one pixel, and repeating the processes from step S504 to step S511.

In step S503, the measurement unit for $\Delta\omega$ and $\Delta\lambda$ is "meter" as for "x", "d"s, and "w". Then, $\Delta\omega$ and $\Delta\lambda$ are transformed to the values in the (c, r) coordinate system (i.e., a projection image coordinate system) which are expressed by using a pixel as a unit by using the following equations, $\Delta c = \Delta\omega/\delta_c$ and $\Delta r = \Delta\lambda/\delta_r$, where "c" and "r" respectively represent column number and row number in the pixel array, $\delta_c$ represents the width of one pixel, and $\delta_r$ represents the height of the pixel.

Then, in step S504, the constant term of the equation: $d_t = (\lambda_t/\cos\theta - \omega\sin\theta)$ representing the projection plane scanning line is calculated by assuming: $d_t = \lambda_t/\cos\theta$.

In addition, the variable "w" initialized to $\omega_{min}/\cos\theta$, which is the coordinate of the begin point of the projection plane scanning line.

Then, in step S505, the coordinates $(\omega_0, \lambda_0)$ of the beginning point of the projection plane scanning line in the $(\omega, \lambda)$ coordinate system are calculated by assuming: $(\omega_0, \lambda_0) = (\omega_{min}, \lambda_t + \omega_{min} \times \tan\theta)$, (see FIG. 9).

Figure 10:
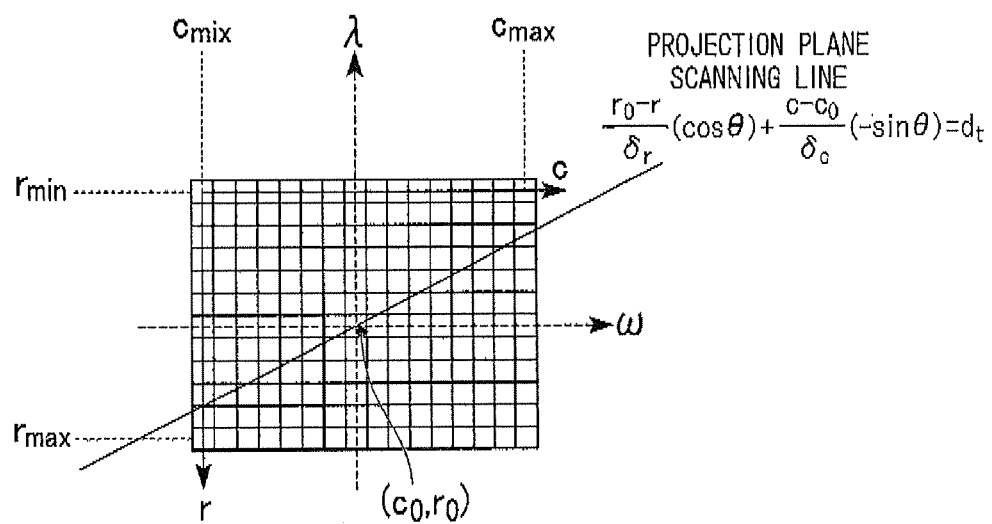
FIG. 10 is a schematic diagram showing the relationship between the projection image coordinate system and the two-dimensional road plane coordinate system.

Then, in step S506, the coordinates $(\omega_0, \lambda_0)$ of the beginning point of the projection plane scanning line are transformed from the $(\omega, \lambda)$ coordinate system for the two-dimensional road plane in which the coordinates are expressed using a unit of distance (e.g., meter) to the (c, r) coordinate system in which the coordinates are expressed using a unit of a pixel in the projection image, and, as shown in FIG. 10, these values are used as initial values of the variables "c" and "r", respectively. More specifically, the variables "c" and "r" are calculated by using an equation of $(c, r) = ((\omega - \omega_0)/\delta_\omega, -(\lambda - \lambda_0)/\delta_\lambda)$, where $\delta_\omega$ represents the width of one pixel, and $\delta_\lambda$ represents the height of the pixel.

Then, in step S507, the inverse transformation is carried out using Equation (2), and (x, y) is calculated by assuming: $d = d_t$.

Figure 11:
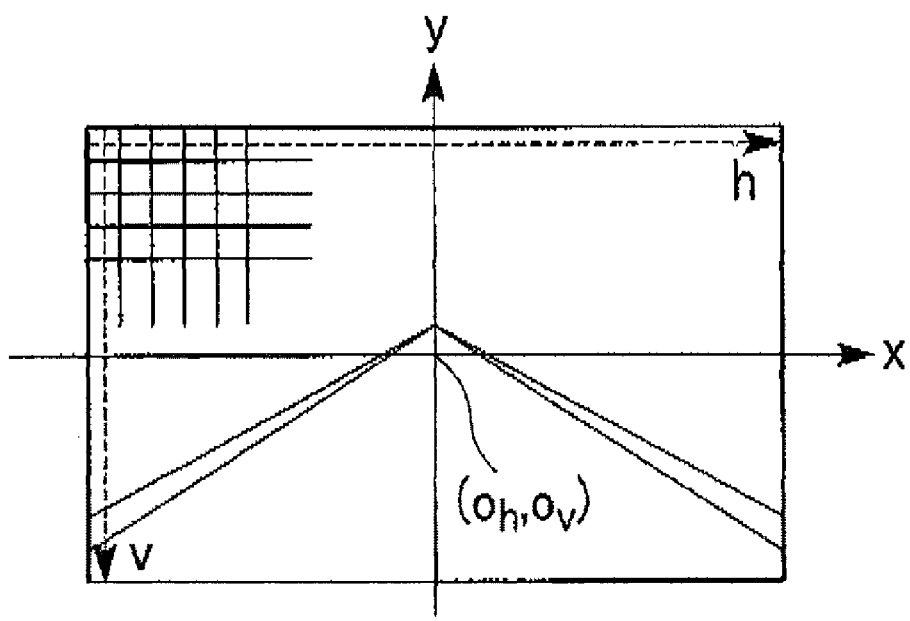
FIG. 11 is a schematic diagram showing the relationship between an input image coordinate system and a the coordinate system

Then, in step S508, as shown in FIG. 11, the coordinate (x, y) in the captured image obtained above and expressed by a unit of distance (e.g., meter) are linked to the (h, v) coordinate system in the input image expressed by a unit of pixel, and thus initial values of the variables "h" and "v" are determined, respectively.

More specifically, with the equation $(h, v) = ((x/\delta_x) + o_h, -(y/\delta_y) + o_v)$, the position of the pixel is calculated, where $\delta_x$ represents the width of one pixel, $\delta_y$ represents the height of the pixel, and $o_h$ and $o_v$ denote the pixel coordinate in the (h, v) coordinate system, which corresponds to the origin of the (x, y) coordinate system.

Then, in step S509, the pixel value of the pixel M[h][v] in the input image is copied and given to the pixel G[r][c] in the projection image.

Then, in step S510, the values r, c, and h are updated by adding $\Delta r$, $\Delta e$, and $\Delta h$, respectively.

Then, in step S511, if "c" has not reached the upper limit, i.e., $c < c_{max}$, the process returns to step S509.

Then, in step S512, if has not reached the upper limit, i.e., $\lambda_t < \lambda_{max}$, the process returns to step S504, and if $\lambda_t \geq \lambda_{max}$, the process is terminated.

In the flowchart shown in FIG. 8, it is possible to generate the projection image from the captured image by carrying out calculation for each of the pixels, which includes three additions in the innermost loop (steps from S509 to S511) and copy of the pixel value. The calculation of this amount can be carried out several hundred times per second by a general processor or a DSP (digital signal processor), without using a dedicated hardware.

(Calculation of Likelihood for Measurement of the Attitude of the Imaging Unit 100)

The process of calculating the similarity between the distant view section and the close view section included in the attitude measurement for the imaging unit 100 that is carried out by the projection likelihood calculation unit 14 will be explained below.

In this embodiment, as described above, the attitude of the imaging unit 100, i.e., the angle of depression and the panning angle, is estimated based on the projection image generated by projecting the captured image onto the virtual road plane. A method that allows the overall features and fluctuation of the image to be efficiently reflected on the similarity require a small computing cost is employed in which the average of the pixel values of the pixels aligned along a specific direction is calculated, and the array of the averages is taken as the projection histogram. This projection histogram is one instance of a feature profile. Instead of calculating the average of the pixel values of the pixels, other features of the image may be used as a feature profile.

Here, the longitudinal projection to be obtained by the projection likelihood calculation unit 14 is defined. When a feature P[G] is calculated with regard to the pixel array at column "c", a one-dimensional array P is defined to be the longitudinal projection. The feature P[c] may be an average brightness, a histogram of pixel value gradient a histogram of color, etc., and among these possible features, one of them is selected based on trade-off between easiness of calculation and expressivity in terms of similarity or difference between the pixel rows.

In the following description, the average of pixel values is taken as an example of feature, the same discussion can be applied as long as the feature is a quantity such as one-dimensional vector or multi-dimensional vector in which a distance can be defined by absolute value of difference or nom.

The projection likelihood calculation unit 14 calculates an average of the pixels values in a range from column "r" to column "r+k", and generates the longitudinal 1D projection in the form of one-dimensional array P using the average as the feature. Each component P[c] is obtained by calculating the average of the pixel values at row "r" through row "r+k" in column "c" using the following equation:

$$P[c]=(G[r][c]+G[r+1][c]+G[r+2][c]+G[r+3][c]+\ldots+G[r+k][c])/(k+1),$$

where expression G[ ][ ] denotes the pixel value of the corresponding pixel.

In the above equation, "c" is a suffix designating the columns, and the component P[c] is calculated for every column " " unless the range is specified.

In addition, when the input image is transformed to the projection image, the region, e.g., the left-bottom and the right-bottom trapezoidal regions shown in FIG. 4, in which corresponding pixels do not exist in the input image before transformation, and thus the pixel values are not given, is not included in the calculation for the average values.

In the present embodiment, an example is shown in which the projection image is divided into two sections, i.e., the distant view section and the close view section, and the longitudinal projection is calculated as the feature profile for each of the sections.

Moreover, in the present embodiment, when the similarity of the longitudinal projections is calculated, the gradient of the average brightness is taken into account for each of the pixels at column "c". More specifically, the gradient at column "c" is calculated based on variation of the average of brightness at column "c−1" located left-hand with respect to column "c" and brightness at column "c+1" located right-hand.

For example, when defining the average of brightness at column "c" to be P[c], the gradient S[c] of the using the following equation:

$$S[c]=(P[c+1]-P[c-1])/2.$$

Figure 12:
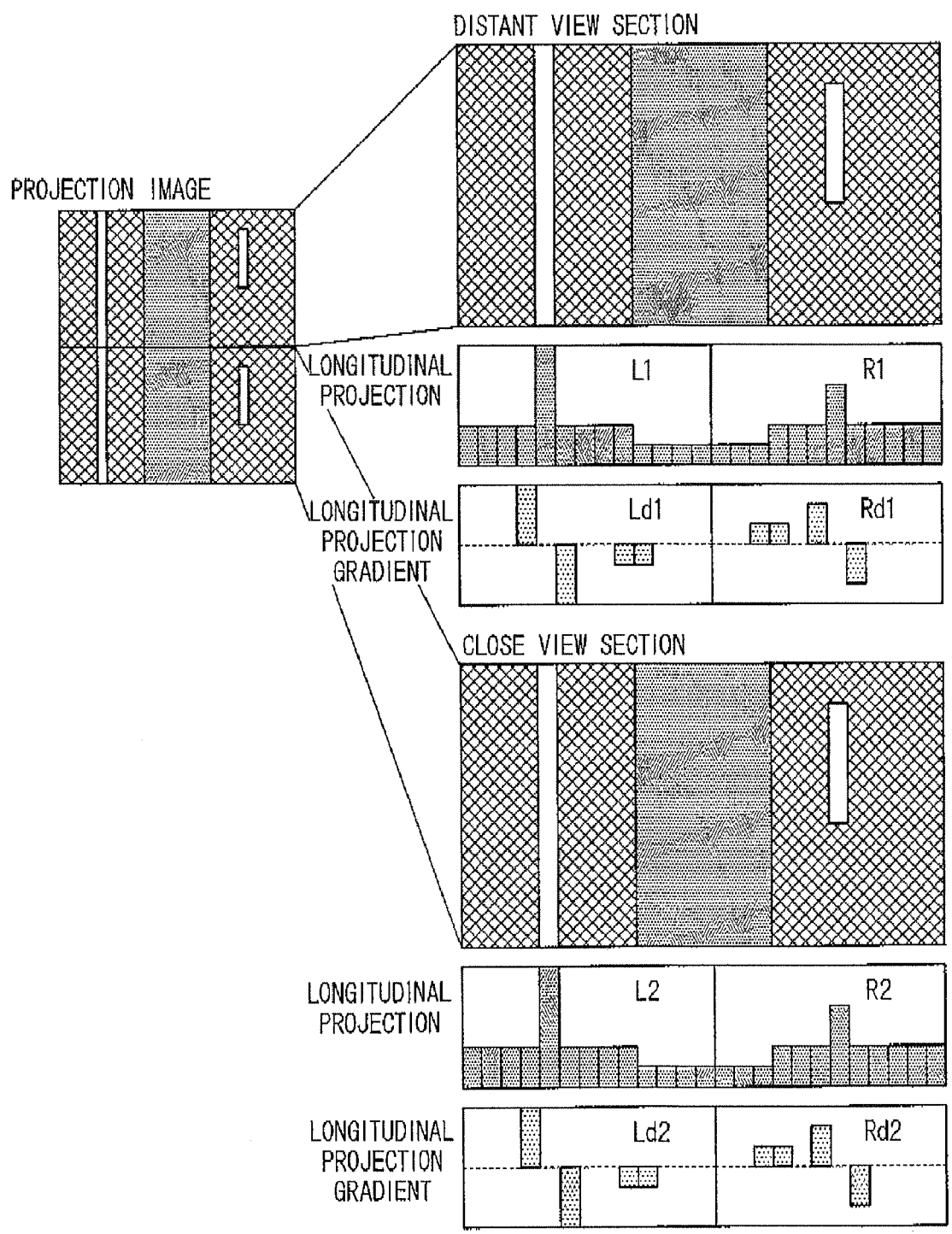
FIG. 12 is a schematic diagram illustrating an operation example of calculating similarity cared out by a projection similarity calculation unit 14 shown in FIG. 1.

The longitudinal projection based on the aforementioned brightness and the pattern array of the gradients of the longitudinal projections are shown in FIG. 12.

In FIG. 12, L1 denotes the calculated longitudinal projection of the left part of the distant view section, R1 denotes the calculated longitudinal projection of the right part of the distant view section, Ld1 denotes the calculated longitudinal projection gradient of the left part of the distant view section, Rd1 denotes the calculated longitudinal projection gradient of the right part of the distant view section, L2 denotes the calculated longitudinal projection of the left part of the close view section, R2 denotes the calculated longitudinal projection of the right part of the close view section, Ld2 denotes the calculated longitudinal projection gradient of the left part of the close view section, and Rd2 denotes the calculated longitudinal projection gradient of the right part of the close view section.

When comparing the longitudinal projection to each other, what is compared is not the average brightness of the longitudinal projection, but the gradient of the longitudinal projection, in a way that the similarity between the distant view section and the close view section of the road surface is calculated as, for example, a correlation coefficient. As a result, when there is a significant brightness difference between the distant view section and the close view section, e.g., at night, the road surface patterns in the distant view section and the close view section are compared while the influence of the brightness difference is reduced; therefore, it is expected that the similarity of the road surface patterns in the distant view section and the close view section is more accurately detected.

In the following description, the similarity between two longitudinal projections, e.g., between the right part of the distant view section and the right part of the close view section, is defined by a numerical value which is obtained by comparing the gradients of the longitudinal projections. As will be explained below, the similarity is defined by a quantity which is maximized when the gradients of the longitudinal projections completely coincide with each other, i.e., higher similarity indicates existence of higher resemblance.

When the road surface pattern is such that markers indicating vehicle lane boundaries which are brighter than the dominant brightness of the road surface and markers which are darker appear alternately, the features of these markers are compensated for each other during the process of calculating brightness average.

When it is necessary to handle such a situation, a histogram of brightness gradient or a histogram of color gradient can be generated for each column "c" as an alternative feature profile.

After sequentially calculating the gradient of the brightness between two pixels next to each other, a histogram of brightness gradient is generated based on the total number of positive gradients and the total number of negative gradients as indicated below, and a similarity comparison may be carried out. An analogous manner may be applied to a histogram of color gradient, i.e., a histogram is generated based on the color differences between the pixels, and a similarity comparison may be carried out.

For example, the total number of the positive gradients of column "c" may be stored in the storage area of the memory 13 as a component P[2×c], and the total number of the negative gradients may be stored in the storage area of the memory 13 as a component P[2×c+1] to form a two layered histogram.

Among the pixels in the projection image, the pixels corresponding to the area out of the imaging field of the captured image are invalid pixels which have no pixel values. The invalid pixels shall be distinguished from other pixels having pixel values by, for example, storing a negative pixel value "−1" as described above. When a pixel value of "−1" is found during the calculation process of forming the projection, the particular pixels are excluded, and a histogram is generated based on the pixel values of the remaining pixels, and then similarity is calculated (Measurement of Angle of Depression and Panning Angle Indicating Attitude Angle)

The process of measuring the attitude angle for estimation of the attitude of the imaging unit 100 that is carried out by the attitude angle calculation unit 15 will be explained below.

When a movable object such as a subject vehicle travels at a sufficient speed for a certain period, it can be assumed that the direction of the vehicle lane and the traveling direction substantially coincide with each other. In this case, the tone (or contrast) of the road surface including lane markers tends to significantly change in the direction perpendicular to the vehicle lane direction, and not to significantly change in the direction along the vehicle lane direction (i.e., traveling direction); therefore, the longitudinal pattern is conspicuous in the captured image of the road surface taken by the imaging unit 100.

Therefore, in the case of the projection image obtained by using the correct attitude angle (angle of depression and panning angle) of the imaging unit 100, a high similarity is expected in the tone profile of the road surface between the upper section and the bottom section, i.e., between the distant view section and the close view section.

Accordingly, the travel state detection unit 17 determines whether the movable object stably travels straight forward based on the output from a yaw rate sensor (an inertia sensor) or the like, and when it is determined that the movable object travels straight forward, the attitude angle calculation unit 15 determines the attitude angle (angle of depression and panning angle) that maximize the similarity of the longitudinal projection between the upper section (the distant view section) of the projection image and the bottom section (the close view section) of the projection image.

After repeating these measurements sufficiently, the attitude angle estimation unit 16 estimates the true attitude angle (angle of depression and panning angle) of the imaging unit 100 based on a set of measured attitude angle values.

Figure 13:
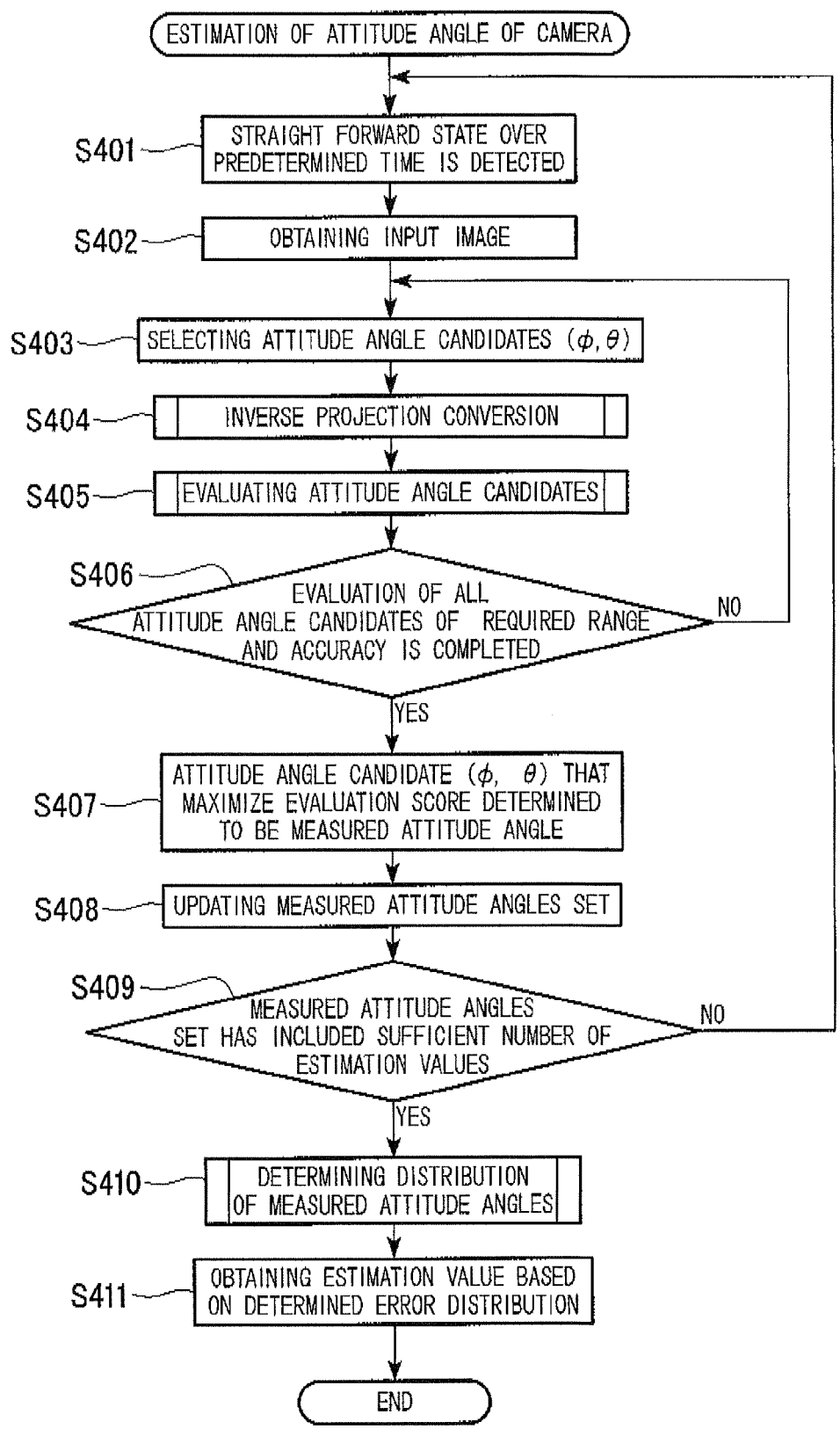
FIG. 13 is a flowchart illustrating an operation example of estimating an attitude angle carried out by an attitude angle calculation unit 15 and an attitude angle estimation unit 16 shown in FIG. 1.

An operation example of the process of measuring the attitude angle (angle of depression and panning angle) carried out by the attitude angle calculation unit 15 according to the present embodiment will be explained below with reference to FIG. 13. FIG. 13 is a flowchart illustrating an operation example of measuring the attitude angle carried out by the attitude angle calculation unit 15. Hereinafter, the processes of which subjects are not specified are carried out by the attitude angle calculation unit 15.

When a straight forward travel state of the subject vehicle is detected by the travel state detection unit 17 in step S401, the attitude angle including the angle of depression and the panning angle is measured by the following steps.

In step S402, the input image (captured image) is obtained by reading out from the memory 13.

Then, in step S403, attitude angle candidates, i.e., combination candidates ((φ, θ) of the angle of depression and panning angle, are selected. When a standard installation angle of depression of the imaging unit 100 is defined to be φ$_0$(rad), a standard inflation error is defined to be ε(rad), and a resolution required in measurement of the angle of depression is defined to be Δφ(rad), the candidates φ of the angle of depression are sequentially selected while varying at an increment of Δφ over a measurement range of [φ$_0$−3×ε, φ$_0$+3×ε]. The candidates θ of the panning angle are also obtained, and thus the above combination candidates (φ, θ) are obtained by similarly setting a measurement range and by varying at an increment of Δθ over the measurement range.

Then, in step S404, a projection (projective) transformation is carried out by the projection transformation unit 12 in accordance with the sequence shown in FIG. 8 in which the attitude angle candidates, i.e., combinations of candidate angles of depression and candidate panning angles, are used, pixel values of the pixels in the input image are obtained while linking the pixels in the input image with the pixels in the projection image using an inverse coordinate transformation, and the obtained pixel values are copied and given to the corresponding pixels in the projection image.

In step S405, as will be described in details, the similarity between the profile of the close view and the profile of the distant view is calculated by applying the projection image to the projection likelihood calculation unit 14, and the similarity is deemed to be an evaluation score of the attitude angle candidate that is used as a temporary attitude angle.

Then, in step S406, it is determined whether the candidates φ of the angle of depression exceed the aforementioned measurement range [φ$_0$−3×ε$_φ$, φ$_0$+3×ε$_φ$]. When the candidates φ of the angle of depression have exceeded the measurement range, it is determined that a sufficient measurement range of candidates and a sufficient number of candidates which are required to achieve a predetermined accuracy have all been evaluated, and the process returns to step S407. Otherwise, when the candidates φ of the angle of depression have not exceeded the measurement range, it is determined that not all candidates have been evaluated, and the process returns to step S403 in which a further attitude angle candidate is selected for the next evaluation. The distribution of the evaluation scores is obtained beforehand by an experiment in which high measurement resolutions Δφ and Δθ are used, and the measurement resolutions Δφ and Δθ are set to sufficiently small values which enable an attitude angle candidate to exist in the close vicinity of the maximum evaluation score in any cases. The number of the attitude angle candidates is determined depending on the measurement range and the measurement resolutions. After finding the candidate in the vicinity of the maximum evaluation score, the process may be further repeated using finer measurement resolutions in order to find the maximum evaluation score at higher accuracy.

In step S407, among the attitude angle candidates evaluated through steps S403 to S406, the combination (φ, θ) of angle of depression and panning angle that achieves the maximum evaluation score is selected as a measured attitude angle.

Then, in step S408, a set of measured attitude angles that have been measured in a time sequence manner and stored in the predetermined storage area of the memory 13 is updated.

Then, in step S409, it is determined whether the number of measurements included in the set of measured attitude angles reaches the number of samples that is required for achieving required estimation accuracy. When the number of the measured attitude angles reaches the required number, the process proceeds to step S410. When the number of the measured attitude angles is less than the required number, the process returns to step S401.

In step S410, the attitude angle estimation unit 16 identifies the probabilistic density distribution of the measured attitude angles, which will be explained separately.

After the identification, the estimation value of the attitude angle is calculated in step S411 based on the error distribution identified by the attitude angle estimation unit 16.

Figure 14:
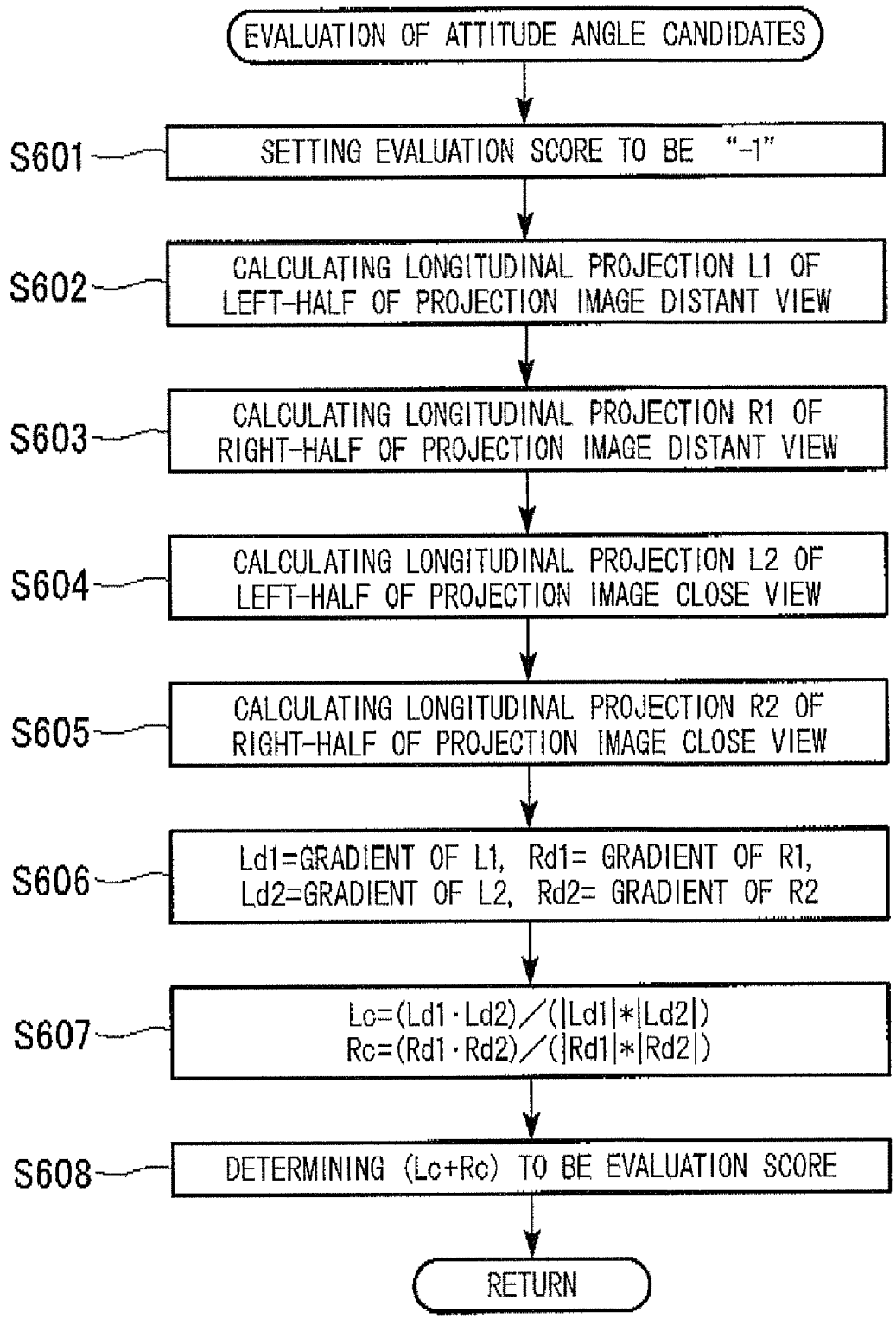
FIG. 14 is a flowchart illustrating an operation example of calculating similarity carried out by the projection likelihood calculation unit 14 shown in FIG. 1.

Next, the evaluation of the attitude angle candidates in step S405 will be explained below with reference to FIG. 14. FIG. 14 is a flowchart showing an operation example of calculating an evaluation score (i.e., similarity) carried out by the projection likelihood calculation unit 14. Hereinafter, the processes of which subjects are not specified are carried out by the projection likelihood calculation unit 14.

In step S601, as shown in step S501, the projection transformation unit 12 initializes the pixel value of each pixel G[r][c] included in the projection image G in the memory by setting it to "−1" which denotes an invalid pixel.

In step S602, the longitudinal projection L1 of the left part of the distant view section is calculated, as shown in FIG. 12.

Similarly, in step S603, the longitudinal projection R1 of the right part of the distant view section is calculated.

In step S604, the longitudinal projection L2 of the left part of the close view section is calculated, and in step S605, the longitudinal projection R2 of the right part of the close view section is calculated.

Then, in step S606, the longitudinal projection gradient Ld1 of the longitudinal projection L1 of the left part of the distant view section, the longitudinal projection gradient Rd1 of the longitudinal projection R1 of the right part of the distant view section is calculated, the longitudinal projection gradient Ld2 of the longitudinal projection L2 of the left part of the close view section, and the longitudinal projection gradient Rd2 of the longitudinal projection R2 of the right part of the close view section are calculated.

In step S607, by treating the array representing the longitudinal projection gradient as a vector, the similarity Lc of the left part of the longitudinal projections can be calculated as the inter-vector cosine obtained by dividing scalar product of Ld1 and Ld2 by norm of Ld1 and Ld2 using the following equation:

$$Lc=(Ld1 \times Ld2)/(|Ld1| \times LdL2|).$$

This calculation is simpler than calculation of a correlation coefficient and if used for vectors having elements whose average is close to zero as in the case of the pixel value gradient, this approximates the correlation coefficient.

In a similar manner, the similarity Lc of the right part of the longitudinal projection is obtained by the following equation:

$$Rc=(Rd1 \times Rd2)/(|Rd1| \times |Rd2|).$$

In step S608, the similarity Lc of the left part of the longitudinal projection and the similarity Rc of the right part of the longitudinal projection calculated in step S607 are added (i.e., Lc+Rc) to obtain the evaluation score.

If the denominator is zero when calculating the similarity Lc or the similarity Rc by the above equation, the evaluation score is deemed to be "−1".

When boundary markers are different from each other in the left part and right part, e.g., a white solid line and a broken line, and there is a projection pattern of medium strength, such as of a skid mark, which is located at a position close to a strong projection pattern of the white solid line that is not parallel to the vehicle lane, there is the effect of the medium strength projection pattern overshadowing that of a weak projection pattern (i.e., the value in the histogram is small) of the broken boundary line. This effect can be reduced by separately calculating the similarity of the left part and the similarity of the right part of the longitudinal projection of the distant view section and the close view section to obtain the evaluation score.

A strong projection pattern means that absolute values of the numerical components of a projection tend to be great. By separately calculating the similarities of the longitudinal projection for the left part and the right part, the evaluation score can be obtained without being excessively affected by the difference in the strength of the longitudinal projection pattern between the left and right lane boundaries.

If the widths over which the longitudinal projections L1, L2, R1, and 2 are calculated are set to be slightly greater than the width of the vehicle lane in the road surface image, the process particularly concentrates on the vehicle lane of the subject vehicle and the boundaries thereof; therefore, an accurate measurement can be expected.

In order to avoid the effect of landscape other than the road surface, a lateral projection of the projection image whose projection axis is perpendicular to the traveling direction may be calculated in a manner similar to that for the longitudinal projection, and a combination candidate (ω, θ), which creates a variance difference that is greater than a predetermined value between the upper section and the bottom section, is deemed to be an error, and is excluded from the comparison candidates.

If an inter-vehicle distance sensor is available, and when the inter-vehicle distance to a preceding movable object (e.g., a vehicle) is small, and it is estimated that there is difference between the longitudinal projection in the upper section and that in the bottom section because the preceding movable object is captured by the imaging unit 100 even using a projection image based on correct angle of depression and panning angle, it is preferable that the measurement of the attitude angle not be carried out.

(Estimation of Angle of Depression and Panning Angle Indicating Attitude Angle)

The calculation process of estimating the attitude of the imaging unit 100 which is carried out by the attitude angle estimation unit 16 will be explained below.

In the above measurement for the attitude angle, it can be assumed that the calculated distribution profile of the measured attitude angle vector $\upsilon(\upsilon=(\omega, \theta))$ contains a uniform distribution of clutter due to variation components of the pixel value that is not perpendicular to the vehicle lane, etc., in addition to a distribution of measurements with normal errors.

Due to this, in order to more accurately estimate the attitude angle of the imaging unit 100, mixture distribution parameters of a uniform distribution including false measurement clutter and a normal distribution of reasonable measurements are estimated (i.e., identification of the distribution profile of the measured attitude angles) based on the distribution profile of the measured attitude angle vector υ, so that the false measurements can be eliminated.

For calculation simplicity, it is assumed that the distribution profile of the measured attitude angles vector v is such that there is no correlation between the φ component and the θ component. In other words, the distributions of the measurement errors in the φ component and the θ component may be deemed to be practically independent in general if the roll angle of the imaging unit 100 is negligible.

The composed distribution parameters can be estimated in an iterative manner using the EM method which is one of the maximum likelihood methods.

When an estimated average vector $\mu_t$, an estimated variance vector $\sigma_t$, and a prior probability $P_t(\Omega_k)$ have been obtained up to step "t", recurrence formulae for calculating the average estimate vector $\mu_{t+1}$, the variance estimates vector $\sigma_{t+1}$, and the prior probability $P_{t+1}(\Omega_k)$, i.e., an estimated attitude angle, at step "t+1" are as follows:

$$\mu_{t+1} = \Sigma_s[v_s \times P(\Omega_1|v_s)/\{P(\Omega_1|v_s) + P(\Omega_2|v_s)\}]/$$
(size of the set $\{s\}$)

$$\sigma_{t+1} = \Sigma_s[(v-\mu(t))^2 \times P(\Omega_1|x_s)/\{P(\Omega_1|x_s) + P(\Omega_2|x_s)\}]/$$
(size of the set $\{s\}$)

$$P_{t+1}(\Omega_k) = \Sigma_s[P(\Omega_k|x_s)/\{P(\Omega_1|x_s) + P(\Omega_2|x_s)\}],$$

where $\Omega_k$ denotes a variable indicating category, $\Omega_1$ denotes a population including true values exhibiting a normal distribution having an average of $\mu$ and an error $\sigma$ as a variance in addition to errors exhibiting a normal distribution, and $\Omega_2$ denotes a clutter population exhibiting a uniform distribution over the measurement range.

In addition, $\{v\}$ denotes a set of parameter measurement vector $(\phi, \theta)$, and "s"th measurement vector is expressed by $v_s$. $\Sigma_s[Q]$ denotes summation of equation Q while varying "s" throughout the index range. Furthermore, $p_t(v_s|\Omega_1)$, $p(v_s|\Omega_2)$, and $P(\Omega_k|v_s)$ are defined as follows:

$$p_t(v_s|\Omega_1) \equiv (2\pi \times \sigma_t)^{-1/2} \exp\{-(v_s-\mu_t)^2/(2 \times \sigma^2)\}$$

$$p(v_s|\Omega_2) \equiv 1/(\text{the area defined by a variable rage of } v)$$

$$p(\Omega_k|v_s) \equiv p_t(v_s|\Omega_k) \times P_t(\Omega_k)/\{p_t(v_s|\Omega_1) \times P_t(\Omega_1) + p(v_s|\Omega_2) \times P_t(\Omega_2)\}.$$

By using the above recurrence formulae, calculation is repeated until the change $[\mu_{t+1}-\mu_t]$ in the estimation parameter $\mu(t)$ falls within a predetermined range. The attitude angle estimation vector $(\phi, \theta)$ corresponding to $v_s$ by which the change in the estimation parameter $\mu(t)$ falls with the predetermined range is deemed to be the estimated attitude angle of the imaging unit 100.

(Pre-Processing by Time Sequence Smoothing)

A time-sequence smoothing image like a persistence of vision in which a moving object in the image exhibits a locus can be obtained by calculating the average and weight for each of the pixels in the captured image in a time sequence manner. The process of generating a time-sequence smoothing image carried out by the image input unit 11 will be explained below.

If the acceptable lane marker types include, for example, a broken line or metallic tacks (or cat's-eye), it is a necessity that the depths of the distant view section and the close view section be set greater than one cycle of length of the lane marker.

Otherwise, even if the projection image is generated based on the correct attitude parameters of the imaging unit 100, the similarity between the longitudinal projection in the distant view section and that in the close view section may be degraded.

However, by using the time-sequence smoothing image generated based on the captured image sequence instead of using the input image as is, the similarity between the longitudinal projection in the distant view section and that in the close view section becomes high under the correct attitude parameters even if the depths of the distant view section and the close view section is comparatively small because the lane marker or the like draws a long locus.

As described above, when the time-sequence smoothing image is used, all of the patterns on the road surface draw loci along the traveling direction, and contribution of the patterns deviating from the traveling direction is reduced, and thus errors in the panning angle measurements, which is caused by the deviation of the road surface patterns in the captured image from the traveling direction, are expected to be reduced.

In a typical method of obtaining the above smoothing image, a pixel value at position (h, v) in the captured image at time "t" is denoted by (h, v), and a recurrence formula for obtaining a pixel value $S_t(h, v)$ at position (h, v) in the smoothing image is set as follows:

$$S_t(h,v) = \alpha \times M_t(h,v) + (1-\alpha) \times S_{t-1}(h,v),$$

where the coefficient $\alpha$ indicates a weight for an input pixel value, and is selected from a range of 0 to 1 ($0<\alpha<1$) depending on the process.

(Panning Angle Correction Based on Yaw Rate)

When the output value of the yaw rate sensor (inertia sensor) 102 stays stable, i.e., the turning angular velocity is being steady, it is believed that the vehicle is driving on an approximate circular track. The panning angle correction operation carried out by the turning effect correction unit 18 will be explained below.

Figure 15:
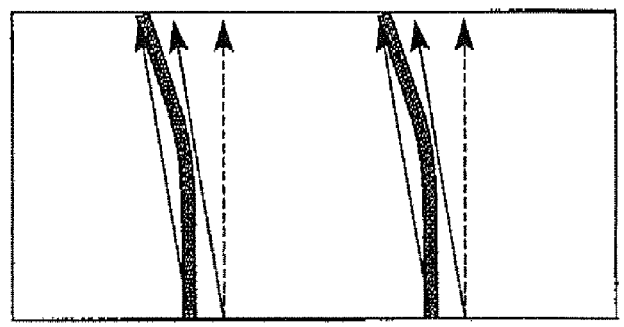
FIG. 15 is a schematic diagram illustrating a process of calculating an error in a panning angle $\theta$ which is carried out by a turning effect correction unit 18.

If the turning radius R during turning is greater than a certain value, it is believed that the measured panning angle calculated from the circular track made by the road surface pattern can be indicated by the solid line arrows while the panning angle of the imaging unit 100 is indicated by the broken line arrows, as shown in FIG. 15.

Figure 16:
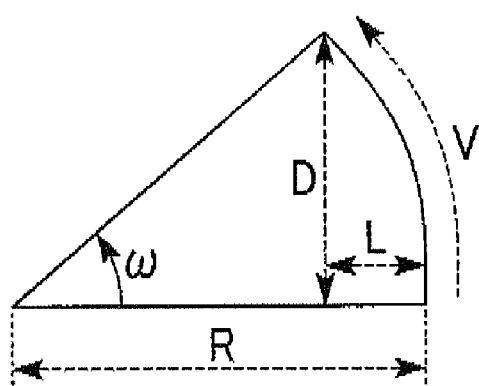
FIG. 16 is also a schematic diagram illustrating the process of calculating an error in panning angle $\theta$ which is carried out by the effect correction unit 18.

As shown in FIG. 16, the turning effect correction unit 18 calculates the turning radius R ($R=V/\omega$) based on the input from the travel state detection unit 17, i.e., based on the vehicle speed V (m/sec) measured by the speed sensor 101 and the yaw rate $\omega$ (omega) by the inertia sensor 102.

The error $\epsilon$ (rad) of the panning angle from the true value can be expressed, using D and L shown in FIG. 16 and a function of arctangent, as follows:

$$\epsilon = a\tan(L/D),$$

where D denotes the depth of the observed range of the road surface, and L is defined as follows:

$$L = (R^2 - D^2)^{1/2} - R.$$

The turning effect correction unit 18 calculates the error $\epsilon$ as an amount of correction for the panning angle measurements using the following equation:

$$\epsilon = a\tan((1-R^2/D^2)^{1/2} - R/D).$$

As described above, the error $\epsilon$ which is obtained from the turning angular velocity is added to or subtracted from the measured panning angle $\theta$ depending on the direction of turning for correction, thereby it is possible to measure the panning angle even during a turning travel, and thus the system utilizing the present invention can be applied to the area where straight roads are scarce.

The attitude angle control with respect to the captured image taken by the frontal view imaging and control device installed on a movable object may be executed by recording a program for implementing fractions of the frontal view imaging and control device installed on a movable object 1 shown in FIG. 1 in a computer-readable medium, by loading the program recorded in the recording medium into a computer system, and by executing the program. Here, "computer system" includes an OS and hardware such as a peripheral device. Furthermore, the "computer system" includes a WWW system having a home page providing environment (or display environment). The "computer-readable recording medium" is a storage device such as a portable medium including a flexible disc, an optical-magnetic disc, a ROM, and a CD-ROM, and a hard disc built in the computer system.

Furthermore, the "computer-readable recording medium" includes a device storing a program for a predetermined time such as a volatile memory device (RAM) inside the computer system that becomes a server or a client in a case in which the program is transmitted through a network such as the Internet or a communication line such as a telephone line.

Furthermore, the program may be transmitted to other computer systems from the computer system in which the program is loaded in a memory device or the like through a transmission medium or carrier waves in a transmission medium. Here, the "transmission medium" means a medium having a function of information transmission such as a network (communication network) including the Internet or a communication line (communication wire) such as a telephone line. Furthermore, the program may implement a part of the above-described functions. The program may be a differential file (differential program) that may be combined with a program recorded in a computer system in advance so as to implement the above-described functions.

What is claimed is:

1. A frontal view imaging and control device installed on a movable object, comprising:
    an image input unit receiving an image taken by an imaging device that captures a region of a road surface in a predetermined direction;
    a projection transformation unit linking each pixel of the image onto a virtual two-dimensional plane of a road surface through coordinate transformation in accordance with an optical model of the imaging device so as to form a virtual projection image on the two-dimensional plane;
    a projection likelihood calculation unit dividing the virtual projection image into a distant view section and a close view section along a longitudinal axis extending in a straight forward direction, projecting the distant view section and the close view section onto a lateral axis, and calculating similarity defined between a projection of the distant view section and a projection of the close view section; and
    an attitude angle calculation unit determining an angle of depression and a panning angle that maximize the similarity between the projection of the distant view section and the projection of the close view section as a measured attitude angle that indicates an image capturing direction of the imaging device.

2. The frontal view imaging and control device according to claim 1, further comprising a pixel value smoothing unit smoothing, in a time sequence manner, each pixel included in the image taken by the imaging device.

3. The frontal view imaging and control device according to claim 1, further comprising:
    a travel state detection unit calculating a turning radius based on a translation velocity and a yaw rate of the movable object respectively measured by a speed sensor and an inertia sensor that are installed on the movable object; and
    a turning effect correction unit correcting the panning axle based on the turning radius.

4. The frontal view imaging and control device according to claim 1, further comprising an attitude angle estimation unit calculating an estimation value of a true attitude angle based on an estimated combination distribution profile that is obtained, based on a set of the measured attitude angles, by combing a normal distribution of measured values containing errors and a uniform distribution of false measurements that are obtained when input images contain disturbances.

5. A frontal view imaging and control program that allows a computer to function as the frontal view imaging and control device installed on a movable object according to claim 1.

* * * * *